United States Patent [19]

Sadakata

[11] Patent Number: 5,056,818
[45] Date of Patent: Oct. 15, 1991

[54] STEERING COLUMN MOUNTING APPARATUS

[75] Inventor: Kiyoshi Sadakata, Gunma, Japan
[73] Assignee: Nippon Seiko Kabushiki Kaisha, Tokyo, Japan
[21] Appl. No.: 546,943
[22] Filed: Jul. 2, 1990
[30] Foreign Application Priority Data
  Jul. 13, 1989 [JP] Japan ............................. 1-81617[U]
[51] Int. Cl.$^5$ ............................................. B62D 1/18
[52] U.S. Cl. .................................... 280/777; 280/780
[58] Field of Search ....................... 280/777, 779, 780

[56] References Cited

U.S. PATENT DOCUMENTS 4,838,576  6/1989  Hamasaki et al. .................. 280/777
4,901,592  2/1990  Ito et al. ............................. 280/777

FOREIGN PATENT DOCUMENTS 2821707  11/1978  Fed. Rep. of Germany ...... 280/777
61-1472   1/1986  Japan .

Primary Examiner—Kenneth R. Rice
Attorney, Agent, or Firm—Shapiro and Shapiro

[57] ABSTRACT

A steering system has a steering shaft carrying at its end a steering wheel, and a steering column through which the steering shaft is extended. A structure for mounting the steering column on the body of a vehicle, comprises:

a support bracket having mounting web portions for securing the support bracket to the body, the support bracket being fixed to the outer peripheral surface of the steering column, each mounting web portion having a notch opening in one end edge thereof;

a clamping plate associated with each mounting web portion, the clamping plate being formed by bending a metallic sheet into substantially a U-shape so as to provide upper and lower flat plate portions, the flat plate portions being provided with apertures and having slip layers of an electrically insulating material provided on the inner opposing surfaces thereof contacting the associated mounting web portion, each clamping plate being fitted on the mounting web portion by sliding from the side adjacent the steering wheel; and bolts which are driven into threaded holes in the body through the apertures in the clamping plates and the notches of the mounting web portions so as to secure the support bracket to the body. A narrow winding portion integral with the clamping plate extends from a main part of the coating plate, and a free end of the winding portion is electrically connected to the mounting web portion.

7 Claims, 5 Drawing Sheets

TOTAL
FORCE

TOTAL
FORCE

RUPTURING
FORCE

RUPTURING
FORCE

SLIDING
FRICTION
FORCE

SLIDING
FRICTION
FORCE

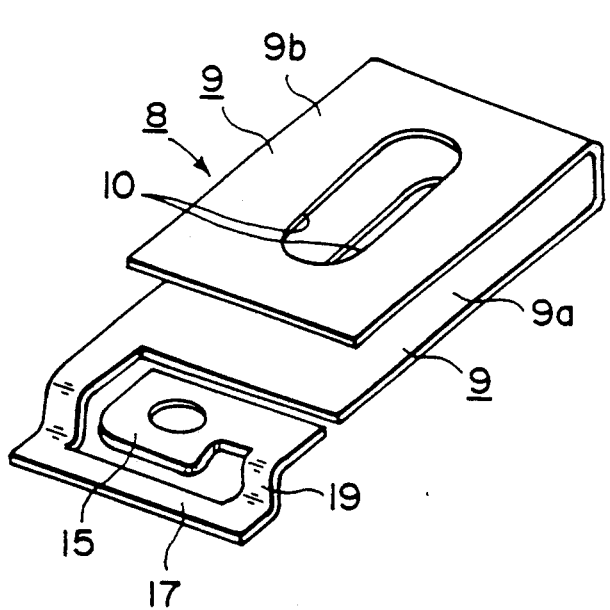
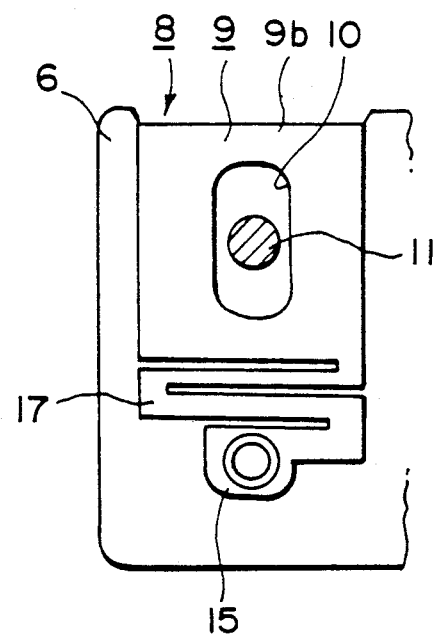
F I G. 6  F I G. 7
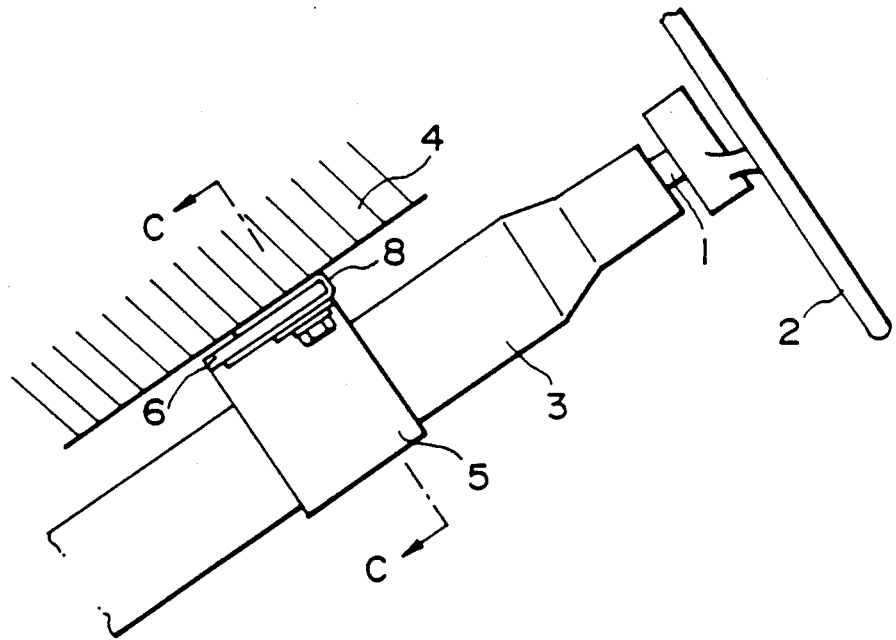
F I G. 8

STEERING COLUMN MOUNTING APPARATUS

BACKGROUND OF THE INVENTION

1. Field of the Invention

The present invention relates to a mounting apparatus for a releasable (e.g., shock absorbing) steering column and is more particularly concerned with such a mounting apparatus incorporating an improved arrangement for establishing an electrical connection between the steering column and the body of a vehicle.

2. Related Background Art

In the event of a collision of an automobile a so-called secondary collision takes place in which the driver collides with the steering wheel, subsequent to so-called primary collision in which the automobile collides with for example, another automobile.

In order to protect the driver by reducing any shock on the driver at the time of the secondary collision, it has been a common measure to adopt a so-called collapsible steering shaft in conjunction with a shock absorbing steering column. When a strong impact is applied to the steering shaft, it collapses along its length, and a shock-absorbing structure for the steering column absorbs the shock of impact.

The structure for mounting such a shock absorbing steering column on a stationary part of the automobile is required to release the steering column so as to allow the steering column to be forwardly displaced when a strong shock is applied thereto.

Conventionally, a structure as shown in FIGS. 8 to 10 has been used for securing a steering column to, for example, the underside of a dash board.

Referring to FIG. 8, a steering shaft 1 is adapted to be rotated by a steering wheel 2 fixed to the upper end thereof. The steering shaft 1 has a collapsible-type construction so that its length can be reduced when it is impacted. A tubular steering column 3, through which the steering shaft 1 is extended, is secured at an intermediate portion thereof to a part of the automobile body 4, e.g., to the underside of a dash board. This steering column 3 also has a collapsible construction so that it can be collapsed in the lengthwise direction in response to a shock thereby absorbing the shock.

A support bracket 5, which is formed by bending a metal sheet, is fixed by, for example, welding to the outer peripheral surface of the intermediate portion of the steering column 3. Mounting web portions 6 for securing the support bracket 5 to the body 4 are formed on both sides of the support bracket 5. U-shaped notches 7 are formed in the mounting web portions 6 in such a manner as to open at side edges of the mounting plates 6 adjacent the steering wheel 2.

A clamping plate 8, which is formed by being a metal sheet in a U-like form, is fitted on the above-mentioned side edge of each mounting web portion 6 from the same side as the steering wheel 2, i.e., from the right upper side as viewed in FIG. 8, in such a manner as to cover the notch 7. The plate 8 has a function of allowing the steering column to be released from the mounting structure with a light force at the time of a collision. More specifically, the plate 8 has a pair spaced flat plate portions 9 which are provided with apertures 10. Slip layers made of an insulating material such as polytetrafluoroethylene (PTFE) are formed on the opposing inner surfaces 9a of the flat plate portions 9 contacting the mounting web portions 6.

The steering column 3 is secured at its intermediate portion to the body through the support bracket 5 having the described construction. To this end, a bolt 11 is driven into a threaded hole 12 of the body 4 through a washer 13, the apertures 10 formed in the plate 8 and through the notch 7 formed in the mounting web portion 6. Consequently, the mounting web portion 6 is strongly clamped by the clamping plate 8, whereby the support bracket 5 is supported on the body 4.

Since the steering column 3 is supported at its intermediate portion on the body 4 in the manner described, the steering column 3 is allowed to displace forwardly (leftward as viewed in FIG. 8) to reduce the risk of injury to the driver. More particularly, when a shock is applied to the steering wheel 2 due to a secondary collision after a primary collision, the shock is immediately transmitted to the steering column 3 so that the steering column 3 is strongly forced in the axial direction. As a result, the notches 7 formed in the mounting web portions 6 separate from bolts 11 and the steering column 3 is collapsed along its length through the collapsible construction thereof (not shown).

Because the slip layers are formed on the inner surfaces 9a of the flat plate portions 9 of each clamping plate, the bolts 11 can escape from the notches 7 in the mounting web portions 6 with a comparatively small force. Thus, the counter-shock produced when the mounting structure is disengaged can be diminished.

Despite their advantage, the slip layers present a problem when electric circuits, such as a circuit for an alarm, are incorporated in the steering wheel 2. In order to supply power to such electric circuits, as by grounding for example, the structure for mounting the steering column 3 must provide an electrical connection between the steering column 3 and the vehicle body 4. However, because the slip layers are made of insulating material and the upper and lower surfaces of the supporting plate portions 6 of the support bracket 5 are in contact with the slip layers, the steering column 3 is electrically isolated from the body 4.

Therefore, an arrangement as shown in, for example, Japanese Utility Model Application Laid-open No. 61-1472 has been proposed to provide an electrical connection between the steering column 3 and the body 4.

FIGS. 11 and 12 show two types of constructions for providing electrical connection between the steering column 3 and the body 4.

Referring first to FIG. 11 showing a first arrangement, an annular conductive portion 15 is connected to an end edge of the clamping plate 8 through a narrow connecting portion 14. In a second arrangement shown in FIG. 12, an annular conductive portion 15 is connected to one end of a conductor line 16 which is connected at its other end to the plate 8.

In each of these arrangements, the conductive portion 15 has an exposed metallic portion. In addition, no friction layer is formed on the external surface 9b of the flat plate portions 9 of the clamping plate 8. It is therefore possible to complete an electrical connection between the steering column 3 and the body 4, through the support bracket 5, the conductive portion 15, the plate 8 and the bolt 11, by connecting the conductive portion 16 to the mounting web portion 6 by, for example, rivets or screws.

The known steering column mounting structure having the described constructions suffers from the following problems.

The structure employing the first arrangement shown in FIG. 11 requires a large force for disengaging the mounting portion at the time of a collision. More specifically, in order for the bolt 11 to escape from the notch 7 in the mounting web portion 6 so as to disengage the mounting structure, it is necessary to apply a force which can overcome the sum of the sliding friction force between the clamping plate 8 and the mounting web portion 6 and the force required for rupturing the connecting portion 14. These forces are illustrated in FIGS. 13A and 13B. As will be appreciated by those skilled in the art, the sliding friction force involves components of static friction and dynamic friction, the static friction being generally greater than the dynamic friction so that the sliding friction is maximized at the moment at which a relative movement is caused between two sliding surfaces. In the arrangement shown in FIG. 11, the sliding movement of the mounting portion 6 relative to the clamping plate 8 begins concurrently with the rupture of the connecting portion 14. This is because movement of clamping plate 8 relative to the body 4 and the washer 13 cannot occur before a displacement of the mounting web portion 6 relative to the clamping plate, since the friction between the outer surfaces 9b of the flat plate portions 9 of the plate 8 and the body 4 or the washer 13 is large. Therefore, in order to disengage the mounting structure at the time of a collision, an external force has to be applied which is large enough to overcome a total force shown in FIG. 13C which is the sum of the maximum sliding friction shown in FIG. 13A and the force shown in FIG. 13B for rupturing the connecting portion 14.

The increase in the force required for disengaging the mounting structure is not so extreme and may seem to present no problem. In order to ensure the safety of the driver, however, the force required for disengaging the mounting structure should be minimized hence there still remains a need for improvement.

In the arrangement shown in FIG. 12, the movement of the mounting web portion 6 relative to the clamping plate 8 begins at a moment which is different from the moment at which the end of the lead line 16 is disconnected, so that the above-mentioned problem is averted. In this case, however, inconvenient measures are required for administration of parts and assembly of the structure because of the use of three separately prepared parts 8, 15 and 16, with the result that the cost of the steering column mounting structure is increased.

In the arrangement shown in FIG. 11, it is possible to hold the clamping plate 8 at a predetermined position on the mounting web portion 6, by fixing the conductive portion 15 to the mounting plate portion 6. In the structure shown in FIG. 12, however, such an advantage cannot be achieved because of a slack of the lead line 16.

SUMMARY OF THE INVENTION

Accordingly, an object of the present invention is to provide a steering column mounting structure which incorporates an arrangement for electrically connecting the steering column to a vehicle body with a minimal number of parts, which can easily be assembled at a low production cost, and which does not significantly increase the impact force required to disengage the mounting structure.

A steering column mounting structure of the invention has, as is the case of the known structure described before, a support bracket having mounting web portions for securing the support bracket to the vehicle body, the support bracket being fixed to the outer peripheral surface of the steering column, each mounting web portion having a notch opening in one end edge thereof; a clamping plate associated with each the mounting web portion, the clamping plate being formed by bending a metallic sheet into a U-like shape so as to provide upper and lower flat plate portions, the flat plate portions being provided with apertures and having slip layers of an insulating material provided on the inner opposing surfaces thereof contacting the associated mounting web portion, each clamping plate being fitted on the associated mounting web portion by sliding from the side adjacent the steering wheel; and the bolts which are driven into threaded holes in the vehicle body through the apertures in the clamping plates and the notches of the mounting web portions so as to secure the support bracket to the body.

In accordance with the invention, preferably each clamping plate further has an integral narrow winding portion extending from a main part thereof and means for providing electrical connection between preferably a free end portion of the winding portion and the mounting web portion.

In the steering column supporting structure of the invention having the features set forth above, the force required for disengaging the mounting structure at the time of collision is reduced because the movement of the mounting web portion relative to the clamping plate takes place at a moment different from the moment at which the winding portion is ruptured.

More specifically, in the event of a collision, the winding portion begins to be straightened concurrently with the start of the movement of the mounting web portion relative to the clamping plate. The bent portion is narrow and thin so that only a very small force is required for straightening the winding portion. Therefore, the force necessary for causing the mounting web portion to be displaced relative to the clamping plate is not increased substantially. As the mounting web portion continues to move relative to the clamping plate, the winding portion is straightened and, after being fully straightened, starts to be ruptured at a portion thereof. In this state, only a relatively small dynamic friction exists between the mounting web portion and the clamping plate, so that the increased force (i.e., counter-shock) upon rupture of the winding portion is insignificant.

BRIEF DESCRIPTION OF THE DRAWINGS

FIG. 6 is a perspective view of a clamping plate used in a second embodiment of the present invention;

FIG. 7 is a sectional view similar to that in FIG. 1, showing a third embodiment of the present invention;

FIG. 8 is a side elevational view of a steering column mounting structure to which the present invention is applied;

DESCRIPTION OF THE PREFERRED EMBODIMENTS

Preferred embodiments of the present invention will be described with reference to the drawings.

Figure 9:
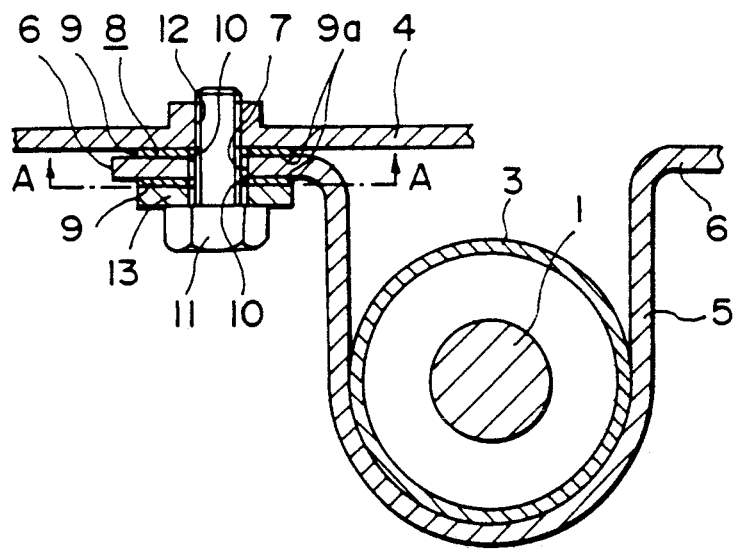
FIG. 9 is an enlarged sectional view taken along the line C—C of FIG. 8.
Figure 10:
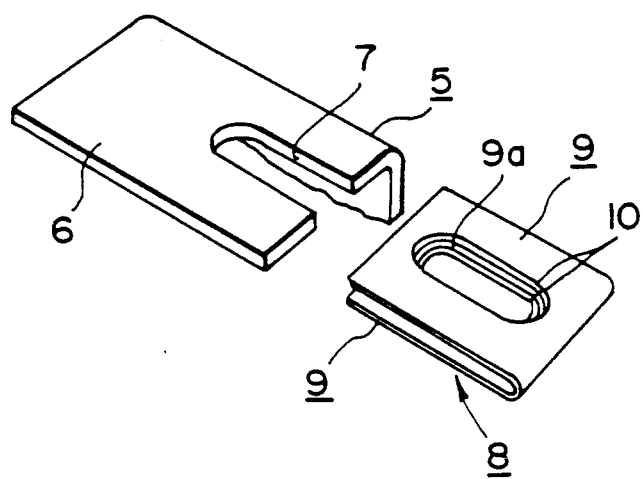
FIG. 10 is a perspective view of a mounting web portion and a clamping plate.
Figure 11:
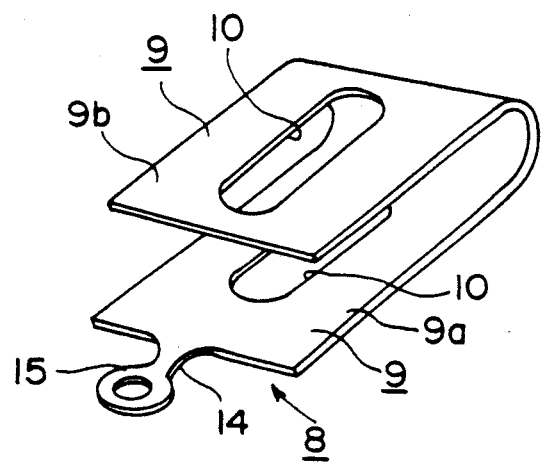
FIG. 11 is a perspective view of a first example of a known clamping plate.
Figure 12:
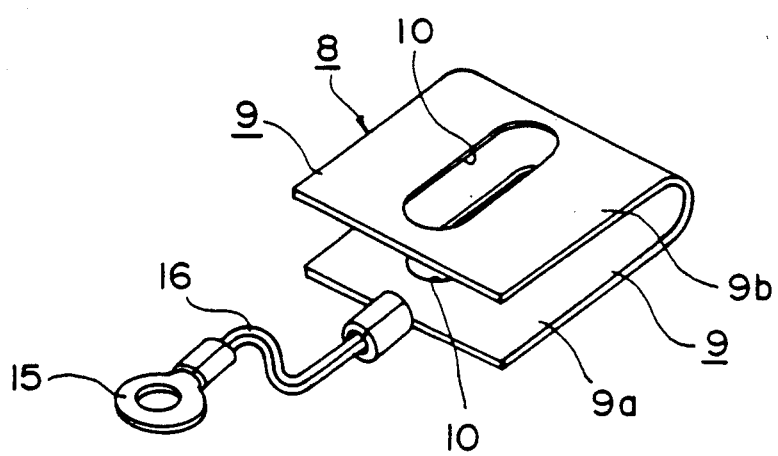
FIG. 12 is a perspective view of a second example of a known clamping plate.

A first embodiment of the invention will be described with reference to FIGS. 1 to 5C. As in the case of the known mounting structure described earlier, a first embodiment of the steering column mounting structure of the present invention has, as shown in FIGS. 8 and 9, a support bracket 5 fixed by welding to an intermediate portion of a steering column 3 through which a steering shaft 1 having a steering wheel 2 fixed to one end thereof is extended, the support bracket 5 having mounting web portions 6 at which the support bracket 5 is secured to the body 4 of a vehicle. U-shaped notches 7 are formed in the mounting web portions 6 of the support bracket 5 so as to open in the edges of the mounting web portions adjacent the steering wheel 2, in the manner shown in FIG. 10.

A clamping plate 8 is formed by bending a metal sheet into a U-shape so as to provide a pair of spaced flat plate portions 9, the flat plate portions 9 having apertures 10. Slip layers made of PTFE, which is electrically insulating, are provided only on the inner opposing surfaces, 9a of the flat plate portions 9 which contact the upper and lower surfaces of the mounting web portion 6.

The clamping plate 8 is fitted on each mounting web portion 6 by sliding from the side adjacent the steering wheel 2. Bolts 11 are tightened into threaded holes 12 formed in the body 4 through the apertures 10 in the plates 8 and the notches 7 formed in the mounting web portions 6, whereby the support bracket 5 is supported by the body 4.

The above construction as thus for described is basically the same as that of the conventional steering column mounting device. A critical feature of the steering column mounting structure of the present invention resides in that a conductive portion 15 is connected to the end of the clamping plate 8 remove from the steering wheel 2 through the intermediary of a winding portion 17.

The winding portion 17 is formed integrally with the clamping plate 8 and is formed by spirally winding a narrow strip-like portion extending from the end of the main part of the plate 8. The conductive portion 15 is provided on the end of the bent portion 17 integrally therewith, and a short cylindrical portion 18 formed on the surface of the mounting web portion 6 is caulked onto the inner peripheral edge of the conductive portion 15, thus attaining an electrical connection between the clamping plate 8 and the mounting web portion 6 through the conductive portion 15 and the bent portion 17.

The outer surfaces 9b of the flat plate portions 9 of the metallic clamping plate 8 are exposed, so that the plate 8 and the body 4 are electrically connected to each other through the metallic washer 13 and the bolt 11 (see FIG. 9), whereby the steering column 3 is electrically connected with the body 4.

The operation of the steering column mounting structure of the invention is similar in fundamental principle to the known devices in that, in response to a shock applied to the steering wheel 2, the collapsible steering column 3 is collapsed with the bolts 11 escaping from the notches 7 formed in the mounting web portions 6.

Figure 5C:
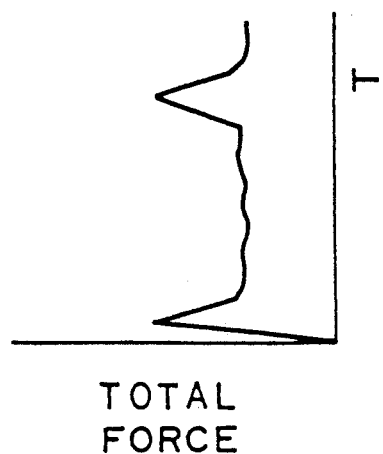
FIGS. 5A, 5B and 5C are graphs showing the level of force required for displacing a steering column.
Figure 5B:
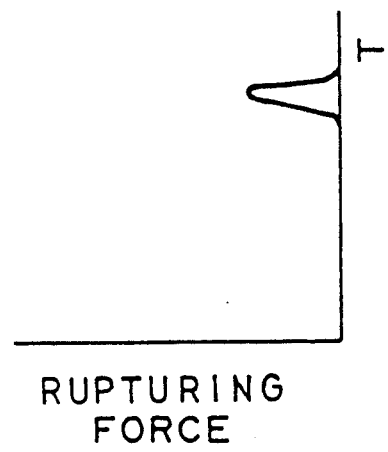
Figure 13B:
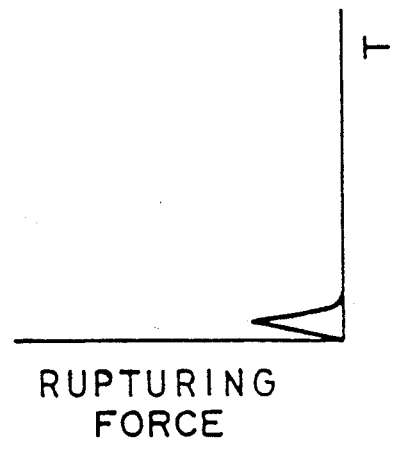
Figure 5A:
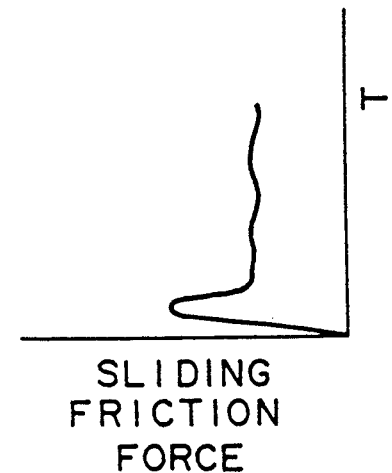
Figure 13A:
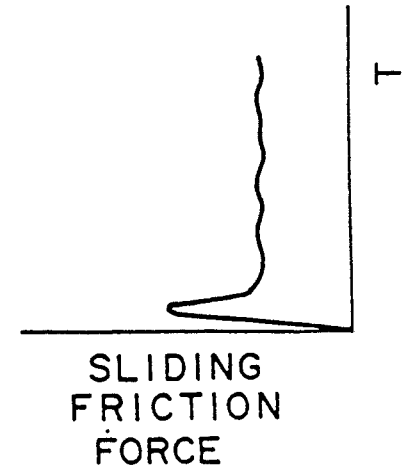

In the event of a collision, the mounting web portion 6 starts to move relative to the clamping plate 8 overcoming the static friction shown in FIG. 5A, while starting to straighten the winding portion 17 through which the conductive portion 15 is connected to the main part of the clamping plate 8. The winding portion 17 is small in width and its thickness is the same as the main part of plate 8 which is formed from a thin metal sheet. Therefore, the force required for straightening the winding portion 17 is very small and does not significantly increase the force for initiating the movement of the mounting web portion 6 relative to the plate 8.

Figure 1:
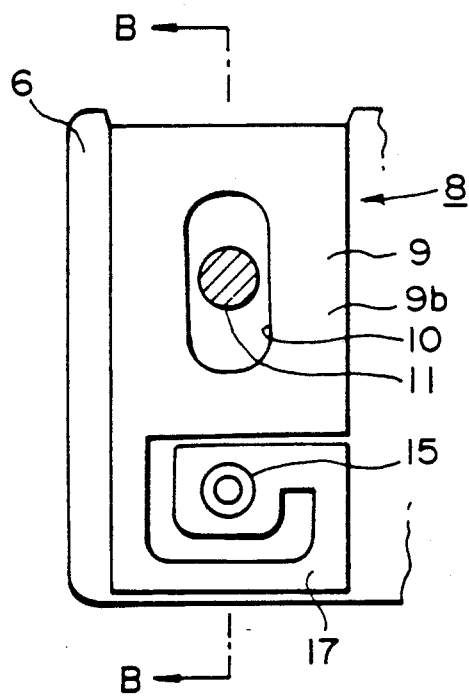
FIG. 1 is a sectional view of a first embodiment of the present invention taken along the line A—A of FIG. 9.
Figure 2:
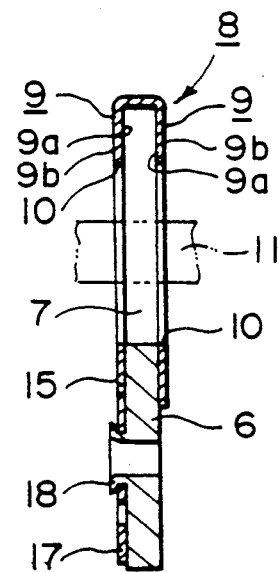
FIG. 2 is a sectional view taken along the line B—B of FIG. 1.
Figure 3:
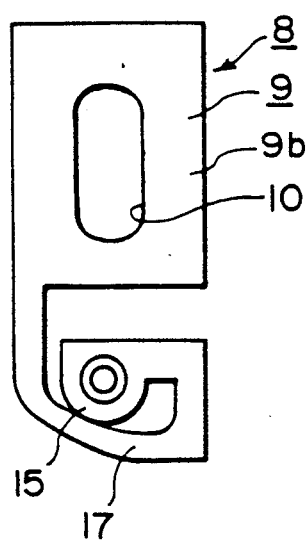
FIGS. 3 and 4 are sectional views similar to that in FIG. 1, illustrating a change in the state of a winding portion which is being straightened as the time elapses.
Figure 4:
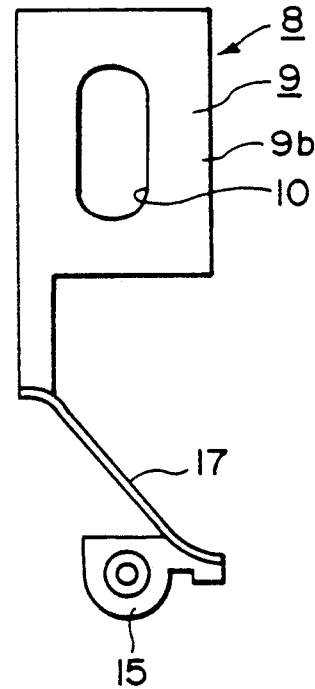
Figure 13C:
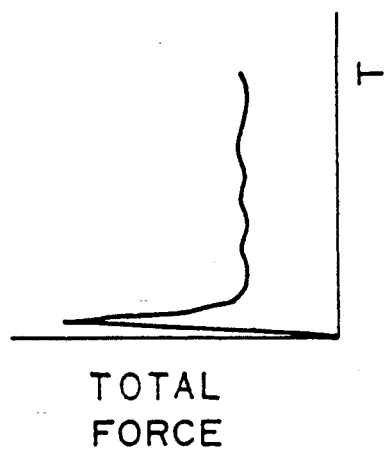
FIGS. 13A, 13B and 13C are graphs showing the level of the force required for displacing the steering column as observed when the clamping plate of FIG. 11 is used.

As a result of the displacement of the mounting web portion 6 relative to the clamping plate 8 in response to the secondary collision, the winding portion 17 is straightened from a state shown in FIG. 3 to a state shown in FIG. 4. A further movement of the winding portion 17 relative to the clamping plate 8 causes a rupture of a part of the winding portion 17. When the rupture takes place, a counter-shock or an impact as shown in FIG. 5B is applied to the steering wheel 2. At such time, the friction acting between the mounting web portion 6 and the clamping plate 8 is a dynamic friction which is much smaller than the initial static friction. Thus, the force required for disengaging the mounting structure at collision varies in relation to time in a manner shown in FIG. 5C, whereby the maximum counter-shock applied to the driver's body colliding with the steering wheel can be diminished.

If the conductive portion 15 is fastened to the mounting web portion 16 by means of, for example, rivets, the clamping plate 8 is held at a predetermined position on the mounting web portion and thus cannot shift or work free.

In the first embodiment as described, since the winding portion 17 is spirally wound, there could conceivably arise a situation in which the side edge of the winding portion 17 interferes with the outer peripheral edge of the conductive portion 15 as shown in FIG. 3. In order to avoid such interference, the winding portion 17 may be partially stepped as at 19, as shown in FIG. 6.

The possibility of undesirable interference between the side edge of the winding portion 17 and the outer peripheral edge of the conductive portion 15 can also be eliminated by forming the winding portion 17 in a zigzag manner, as shown in FIG. 7, instead of using a stepped configuration.

As will be appreciated from the foregoing description, the steering column supporting structure of the present invention achieves a shock absorbing arrangement which incorporates an electrical connection between the steering column and the vehicle body, with only a small number of parts which can be assembled easily. The invention thus facilitates both parts administration and the assembly process. Moreover, the invention achieves these advantages without significantly increasing the impact force required to disengage the steering column supporting structure, and thus without compromising driver safety.

What is claimed is:

1. In a steering system of a vehicle, apparatus releasably mounting a steering column to a body of the vehicle for displacement of the steering column in response to driver impact upon a collision of the vehicle and electrically connecting the steering column to the vehicle body to effect electrical connection of an electric circuit to the vehicle body through the steering column, said apparatus comprising:

a support bracket fixed to said steering column and having at least one mounting web portion provided with a notch open at one end of said mounting web portion, and a one-piece substantially U-shaped electrically conductive plate member having a pair of spaced, apertured plate portions with opposed inner surfaces provided with slip layers of electrically insulating material, and a winding portion extending from a main portion of one of said plate portions, said plate member being secured to said vehicle body by bolt means extending through respective apertures in said plate portions and through said notch of said mounting web portion, with said mounting web portion being slidably releasably clamped between said inner surfaces of said plate portions to enable said displacement of said steering column, said winding portion having a point of attachment to said mounting web portion remote from said main portion of said one plate portion for displacement with said steering column and for unwinding said winding portion by such displacement, the attachment providing an electrical connection of said plate member to said mounting web portion.

2. Apparatus according to claim 1, wherein said winding portion winds unidirectionally to form a plurality of turns.

3. Apparatus according to claim 1, wherein said winding portion winds in substantially zig-zag fashion to form a plurality of turns.

4. Apparatus according to claim 1, wherein said winding portion includes a portion between said main portion of said one plate portion and said point of attachment and which is bent out of a plane of said main portion.

5. Apparatus according to claim 4, wherein said bent-out portion of said winding portion is bent in step-like fashion at opposite lengthwise ends thereof.

6. Apparatus according to claim 1, wherein said bolt means is threaded into a threaded hole of said vehicle body.

7. Apparatus according to claim 1, wherein said support bracket includes an additional mounting web portion provided with a notch open at an end of said additional mounting web portion corresponding to said one end of the first-mentioned mounting web portion, an additional one-piece substantially U-shaped electrically conductive plate member having a pair of spaced, apertured plate portions with opposed inner surfaces provided with slip layers of electrically insulating material, and a winding portion extending from a main portion of one of said plate portions of said additional plate member, said additional plate member being secured to said vehicle body by bolt means extending through respective apertures in said plate portions thereof and through said notch of said additional mounting web portion, with said additional mounting web portion being slidably releasably clamped between said inner surfaces of said plate portions of said additional plate member to enable said displacement of said steering column, said winding portion of said additional plate member having a point of attachment to said additional mounting web portion remote from said main portion of said one plate portion of said additional plate member for displacement with said steering column and for unwinding said winding portion of said additional plate member by such displacement, the last-mentioned attachment providing an electrical connection of said additional plate member to said additional mounting web portion.

* * * * *